(12) United States Patent
Kang et al.

(10) Patent No.: US 11,102,055 B2
(45) Date of Patent: Aug. 24, 2021

(54) NETWORK SELF-DIAGNOSIS CONTROL DEVICE BASED ON BLOCK CHAIN

(71) Applicant: HAMONSOFT CO., LTD., Seoul (KR)

(72) Inventors: Won Sok Kang, Seongnam-si (KR); Seok Ho Lee, Gimpo-si (KR)

(73) Assignee: HAMONSOFT CO., LTD., Seoul (KR)

( * ) Notice: Subject to any disclaimer, the term of this patent is extended or adjusted under 35 U.S.C. 154(b) by 0 days.

(21) Appl. No.: 16/364,546

(22) Filed: Mar. 26, 2019

(65) Prior Publication Data
US 2019/0296961 A1 Sep. 26, 2019

(30) Foreign Application Priority Data
Mar. 26, 2018 (KR) .................. 10-2018-0034465

(51) Int. Cl.
*G06F 16/23* (2019.01)
*H04L 12/24* (2006.01)
*H04L 9/06* (2006.01)

(52) U.S. Cl.
CPC ........ *H04L 41/065* (2013.01); *G06F 16/2358* (2019.01); *H04L 9/0637* (2013.01); *H04L 41/069* (2013.01); *H04L 41/0613* (2013.01); *H04L 41/0853* (2013.01); *H04L 41/0869* (2013.01); *H04L 41/12* (2013.01); *H04L 2209/38* (2013.01)

(58) Field of Classification Search
CPC .. H04L 41/065; H04L 9/0637; G06F 16/2358
USPC ....................................................... 709/224
See application file for complete search history.

(56) References Cited

U.S. PATENT DOCUMENTS

2018/0075527 A1* 3/2018 Nagla ................. G06F 21/64
2018/0375750 A1* 12/2018 Moeller ................. G06F 16/27

FOREIGN PATENT DOCUMENTS

KR    10-2006-0055189 A    5/2006
KR    10-0811004 B1    2/2008
(Continued)

OTHER PUBLICATIONS

Korean Office Action for related KR Application No. 10-2018-0034465 dated May 3, 2019 from Korean Intellectual Property Office.

*Primary Examiner* — Sibte H Bukhari
(74) *Attorney, Agent, or Firm* — Paratus Law Group, PLLC

(57) ABSTRACT

Disclosed is a network self-diagnosis control device based on a block-chain. The device includes a management policy registering unit configured for registering, in a block-chain gateway, an identification code for each of a plurality of network nodes constituting a target network and a management policy indicating a permission range, an operation verifying unit configured for verifying an operation of a specific network node executed by a specific user through the block-chain gateway, and an operation permission determining unit configured for, when the operation of the specific network node is not registered on the block-chain gateway, self-diagnosing management policies of other network nodes of the same type as the specific network node in the block-chain gateway and for determining whether to permit the operation based on the self-diagnosing result.

6 Claims, 3 Drawing Sheets

(56) References Cited

FOREIGN PATENT DOCUMENTS

| KR | 10-2013-0129408 A | 11/2013 |
| KR | 10-2014-0018089 A | 2/2014 |
| KR | 10-2017-0040079 A | 4/2017 |

\* cited by examiner

NETWORK SELF-DIAGNOSIS CONTROL DEVICE BASED ON BLOCK CHAIN

CROSS-REFERENCE TO RELATED APPLICATION

This application claims priority to and the benefit of Korean Patent Application No. 10-2018-0034465 filed on Mar. 26, 2018, which is hereby incorporate by reference in its entirety.

BACKGROUND

The present invention relates to a network self-diagnosis control technology based on a block-chain, and more particularly to, a network self-diagnosis control device that may control an operation of a network node based on information stored in the block-chain.

A block-chain is a technology for preventing data falsification based on a distributed computing technology. In addition, the block-chain stores small data, which is referred to as a 'block' in a distributed manner. Thus, the block does not be arbitrarily modified, and may be freely browsed by anyone. The block-chain is a change list that records continuously changed data on all participating nodes, and is designed to prevent arbitrary manipulation by an operator of a distributed node. A well-known example of the block-chain is a Bit Coin, which is a decentralized electronic account book that records transaction processes of a cryptocurrency.

Korean Patent Application Publication No. 10-2006-0055189 (May 23, 2006) relates to a system and a method for managing and diagnosing network performance information in a communication network. In a network performance diagnosis, a probing device copies packets passing along a network link in real time and detects the packets based on packet filtering rules to measure and transmit sequential quality of service information. A network performance diagnostic server manages an operation of one or more probing devices. A database server processes and statistically processes the collected data from one or more network performance diagnosis servers, and manages and diagnoses network performance information by integrated management. A database server processes statistically the data collected from one or more network performance diagnosis servers.

Korean Patent No. 10-0811004 (Feb. 29, 2008) relates to a method for self-diagnose of security management in an information telecommunication network. The method includes: automatically checking a vulnerability based on a check command in a network constituted by a PC and a server, and then receiving IP information to notify the check result; selecting a check method for each PC or server based on the received IP information, and checking the PC or server based on a check plan; and storing the check result, filtering unnecessary exception items of a user among checked items, and then notifying the user or a security manager/CERT.

RELATED ART DOCUMENT

Patent Document

Korean Patent Application Publication No. 10-2006-0055189 (May 23, 2006)

Korean Patent No. 10-0811004 (Feb. 29, 2008)

SUMMARY

The present invention provides a network self-diagnosis control device based on a block-chain that may control an operation of a network node based on information stored in a block-chain.

The present invention also provides a network self-diagnosis control device based on a block-chain that may control an operation of a specific network node based on a management policy registered on a block-chain gateway.

The present invention also provides a network self-diagnosis control device based on a block-chain that may determine, when an unregistered operation is detected, whether to permit the corresponding operation with reference to a management policy for other network nodes of the same type.

In an aspect, a network self-diagnosis control device based on a block-chain is provided. The device includes a management policy registering unit configured for registering, in a block-chain gateway, an identification code for each of a plurality of network nodes constituting a target network and a management policy indicating a permission range, an operation verifying unit configured for verifying an operation of a specific network node executed by a specific user through the block-chain gateway, and an operation permission determining unit configured for, when the operation of the specific network node is not registered on the block-chain gateway, self-diagnosing management policies of other network nodes of the same type as the specific network node in the block-chain gateway and for determining whether to permit the operation based on the self-diagnosing result.

In one implementation of the aspect, the management policy registering unit may compare information about each of the plurality of network nodes with reference information pre-stored in the block-chain gateway, and, when a corresponding network node is determined to be valid based on the comparison, assigning an identification code to the corresponding network node.

In one implementation of the aspect, when the operation verifying unit monitors the target network, and detects the operation of the specific network node executed by the specific user, the operation verifying unit may determine whether the detected operation matches with information about the specific network node registered on the block-chain gateway.

In one implementation of the aspect, when the operation of the specific network node complies with the management policy registered on the block-chain gateway, the operation verifying unit may permit the operation of the specific network node, and update the block-chain gateway based on the operation execution.

In one implementation of the aspect, when the operation of the specific network node violates the management policy registered on the block-chain gateway, the operation verifying unit may provide caution information about the specific network node to all of the other network nodes in the target network, or change a reliability level of the specific node to update the block-chain gateway.

In one implementation of the aspect, the operation permission determining unit may learn data packet information transmitted from or received by the plurality of network nodes to determine at least one network node of the same type as the specific network node.

In one implementation of the aspect, when the management policy about the at least one network node of the same type contains information about the operation of the specific network node, the operation permission determining unit may determine whether to permit the operation of the specific network node based on the corresponding management policy.

In one implementation of the aspect, the operation permission determining unit may determine whether to permit the operation of the specific network node based on a management policy about a network node with the highest reliability level among the at least one network node of the same type.

DETAILED DESCRIPTION

Figure 1:
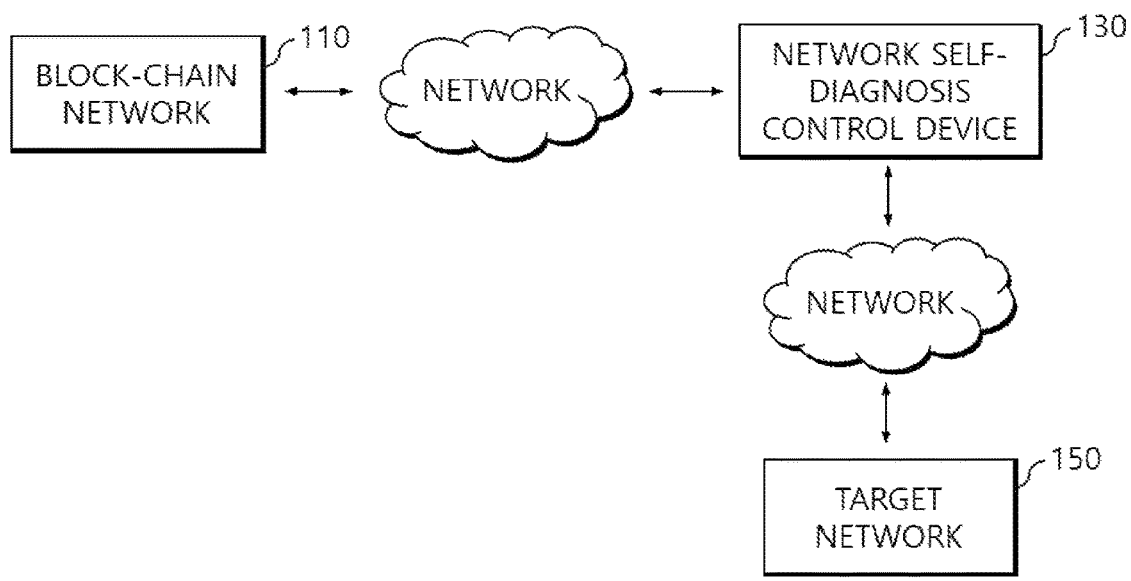
FIG. 1 illustrates a network self-diagnosis control system based on a block-chain according to an embodiment of the present invention.

Explanation of the present invention is merely an embodiment for structural or functional explanation. Therefore, the scope of the present invention should not be construed to be limited to the embodiments explained in the embodiment. That is, the embodiment may be variously modified and may take various forms. Thus, it should be understood that the scope of the present invention encompasses equivalents capable of realizing technical features. Further, purposes or effects set forth in the present invention are not meant to imply that a particular embodiment should include all or only these effects. The scope of the present invention should not be understood as being limited thereto.

Terms described in the present invention may be understood as follows.

The terms "first", "second", and so on are used to distinguish one component from another component, and these components should not be limited by these terms. For example, a first component could be termed a second component, and likewise, a second component could be termed a first component.

It will be understood that when a component is referred to as being "connected to", or "coupled to" another component, it can be directly on, connected to, or coupled to the other component, or one or more intervening components may be present. In contrast, when a component is referred to as being "directly connected to" or "directly coupled to" another component or layer, there are no intervening components present. Further, other expressions that describe relationships between components, such as "between", "directly between", "adjacent to", "directly adjacent to", or the like should be also interpreted as above.

As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, components, parts, or combinations thereof but do not preclude the presence or addition of one or more other features, integers, operations, components, parts, or combinations thereof.

Identification letters (e.g., a, b, c, etc.) in respective steps are used for the sake of explanation and do not described order of respective steps. The respective steps may be changed from a mentioned order unless specifically mentioned in context. Namely, respective steps may be performed in the same order as described, may be substantially simultaneously performed, or may be performed in reverse order.

The present invention may be implemented using a computer readable code on a computer readable recording medium. In addition, the computer readable recording medium includes all kinds of recording media storing data that may be decoded by the computer system. Examples of the computer readable recording medium include a ROM (Read Only Memory), a RAM (Random Access Memory), a CD-ROM, a magnetic tape, a floppy disk, an optical data storage device, etc. Further, the computer readable recording medium may be stored and executed using codes distributed in computer systems connected to a computer network and readable in a distributed manner.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A block-chain may be started with a creation of the first block, and each block may contain information about a previous or subsequent block. Further, each subsequent block may contain a hash of the previous block on the block-chain. Each block constituting the block-chain may be connected to another block using hash information, and actual data information stored in each block may vary widely.

The block on the block-chain may verify contents thereof using a digital signature mechanism. For example, in a cryptocurrency, a transaction that executes a remittance may include a digital signature and a public key corresponding the digital signature. Further, the public key may be used for verifying that an entity that has executed the transfer of money is actually an owner of the currency. More specifically, the block may refer to previous transactions associated with a digital signer in relation to the corresponding transaction, and confirm that the corresponding signer has sufficient funds such that the corresponding transaction may be verified as a valid transaction.

FIG. 1 illustrates a network self-diagnosis control system based on a block-chain according to an embodiment of the present invention.

With reference to FIG. 1, a network self-diagnosis control system 100 based on a block-chain may include a block-chain network 110, a network self-diagnosis control device 130, and a target network 150.

The block-chain network 110 may include a peer-to-peer (P2P) network in which nodes forming a network are connected to each other in a block-chain manner to perform independent operations. The block-chain network 110 may store various information about each of the nodes forming the target network 150. For example, the block-chain network 110 may include identification information about each of the nodes, a management policy indicating a permission range, transaction information associated with each of the nodes, and meta data about each of the nodes. The meta data may include a type of the node, a node ID, a reliability of the node, and the like.

The block-chain network 110 may include one network, or may include a network group formed by connecting a plurality of networks. When the block-chain network 110 is constituted by the plurality of networks, an update result of a specific network may be reflected to other networks via a synchronization.

The network self-diagnosis control device 130 may be implemented as a server corresponding to a computer or a program that may execute control of the target network 150, which is corresponding to a management object. The network self-diagnosis control device 130 may be connected to the block-chain network 110 and the target network 150 in a wired or wireless manner, and may exchange data through the network.

The network self-diagnosis control device 130 may be implemented with a database (not shown in FIG. 1), or may be implemented independently of the database. When implemented independently of the database, the network self-diagnosis control device 130 may be connected to the database in a wired or wireless manner to exchange the data.

The target network 150 may include a local network managed by the network self-diagnosis control device 130. The target network 150 may be constituted by a plurality of network nodes, and the network nodes may be connected to each other via links. The network node is a basic element that constitutes a network. A computer connected to the network and devices in the computer are collectively referred to as the network node. For example, when there is a local network A constituted by 10 computers, 2 hubs, 2 sharing devices, and a router, each of the computers, hubs, sharing devices, and router corresponds to one network node. Thus, the local network A may contain a total of 15 network nodes.

The target network 150 may be connected to the network self-diagnosis control device 130 through one manager node, or may be indirectly connected to the block-chain network 110 through the network self-diagnosis control device 130. In this connection, the manager node may include a node that manages the plurality of nodes forming the network.

The target network 150 may include one network, or may include a network group formed by connecting a plurality of networks. When the target network 150 is constituted by the plurality of networks, the networks may operate independently, and may be independently connected to the network self-diagnosis control device 130.

Figure 2:
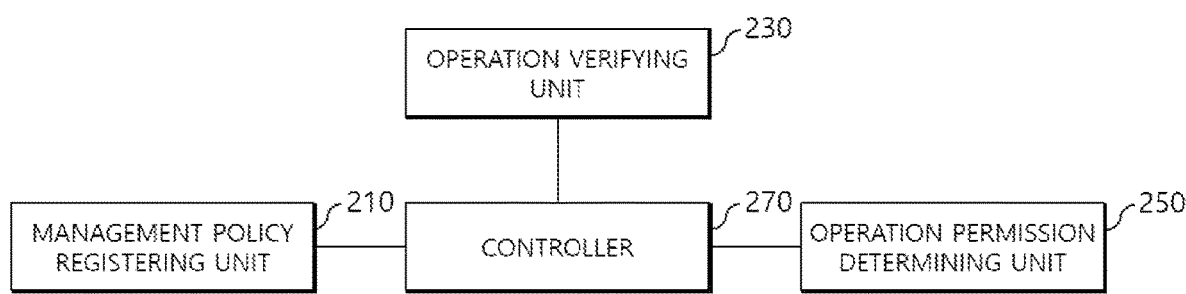
FIG. 2 is a block diagram illustrating a network self-diagnosis control device in FIG. 1.

FIG. 2 is a block diagram illustrating a network self-diagnosis control device in FIG. 1.

With reference to FIG. 2, the network self-diagnosis control device 130 may include a management policy registering unit 210, an operation verifying unit 230, an operation permission determining unit 250, and a controller 270.

The management policy registering unit 210 may register an identification code for each of the plurality of network nodes constituting the target network 150 and the management policy indicating the permission range in the block-chain gateway. In this connection, the block-chain gateway may include one node constituting the block-chain network 110, and may relay data exchange between the block-chain network 110 and the network self-diagnosis control device 130.

The identification code may include a unique device ID of a device corresponding to each network node, and may include identification information per device assigned by the network self-diagnosis control device 130. The management policy may be associated with a particular network node, and may contain predetermined information about allowed objects, contents, ranges, and the like per each operation executed on the particular network node.

In one embodiment, the management policy registering unit 210 compares each of the plurality of network nodes with the information stored in the block-chain gateway. When the network node is a valid network node, the management policy registering unit 210 may assign the identification code to the network node. The block-chain gateway may contain information about the network nodes in the target network 150. Therefore, the management policy registering unit 210 may determine the validity of each network node by comparing the information received from the network nodes with the information about the network nodes stored in the block-chain gateway.

The management policy registering unit 210 may assign the identification code to the network nodes matching with the information stored in the block-chain gateway. In addition, the management policy registering unit 210 may register, in the block-chain gateway, the management policy defined in relation to the operation, content, range, and the like that may be executed in association with the corresponding network node to which the identification code is assigned.

The operation verifying unit 230 may verify an operation of a specific network node executed by a specific user via the block-chain gateway. More particularly, when the specific user attempts to execute the operation associated with the specific network node, the operation verifying unit 230 may determine whether to permit the operation based on the information of the corresponding network node stored in the block-chain gateway.

In one embodiment, when the operation verifying unit 230 monitors the target network 150, and detects an operation of a specific network node executed by a specific user, the operation verifying unit 230 may determine whether the detected operation matches with information about the specific network node registered on the block-chain gateway. The operation verifying unit 230 may monitor the operation of each network node of the target network 150. When the operation of the specific network node is detected, the operation verifying unit 230 may identify the identification code of the corresponding network node, and retrieve the management policy information associated with the corresponding network node in the block-chain gateway based on the identified identification code.

In one embodiment, when the operation of the specific network node complies with the management policy registered on the block-chain gateway, the operation verifying unit 230 may permit the operation of the specific network node, and update the block-chain gateway based on the operation execution. The information associated with the network node stored in the block-chain gateway may contain the management policy about the corresponding network node, the operation verifying unit 230 may obtain management policy information stored in the block-chain gateway based on the identification code of the network node.

When the operation of the corresponding network is permitted based on the management policy, the operation verifying unit 230 may update the information stored in the block-chain gateway based on the operation execution of the corresponding network node.

In one embodiment, when the operation of the specific network node violates the management policy registered on the block-chain gateway, the operation verifying unit 230 may provide caution information about the specific network node to all of the other network nodes in the target network 150, or change a reliability level of the specific network node to update the block-chain gateway.

The operation verifying unit 230 may not permit the operation that violates the management policy. Alternatively, when the operation is permitted, the operation verifying unit 230 may provide the caution information about the corresponding network node to all of the other network nodes through the target network 150 to which the corresponding network node belongs. The caution information may include an identification code of the network node, which is a subject of caution, operation information of the network node, which is the subject of caution, and the like.

The operation verifying unit 230 may periodically update reliability information about the network nodes in the target network 150. In addition, the operation verifying unit 230 may assign a reliability equal to or below a certain level to the network node that has executed the operation in violation of the management policy to update the block-chain gateway. For example, the operation verifying unit 230 may assign a reliability of 30 (in this case, the reliability may have a value between 0 and 100) unconditionally on the network node that has executed the operation in violation of the management policy to update the block-chain gateway.

When the operation of the specific network node is not registered on the block-chain gateway, the operation permission determining unit 250 may self-diagnose a management policy about other network nodes of the same type as the specific network node in the block-chain gateway and determine whether to permit the operation of the specific network node based on the self-diagnosing result. In this connection, the self-diagnosis may include performing a control for the network nodes automatically without a manual control of the network manager by determining the management policy about the specific network node with reference to the management policies about other network nodes or by determining whether to permit the operation of the specific network node.

An example of a case in which the operation of the specific network node is not registered may include: when the information itself about the specific network node does not exist; when the information about the network node exists but the operation itself of the network node is not registered; when the operation is registered but detailed conditions related to the operation such as information about users who have execution authority, execution range, and the like do not exist such that whether to permit the operation may not be able to be determined; and the like.

In one embodiment, the operation permission determining unit 250 may learn data packet information transmitted from or received by the plurality of network nodes, and determine at least one network node corresponding to the same type as the specific network node. The operation permission determining unit 250 may collect the data packet information transmitted from or received by the network node, and perform a learn in which an input is the identification information and the data packet information of the network node, and an output is predetermined type information of the network node.

The operation permission determining unit 250 may determine the at least one network node classified as the same type for the specific network node based on the learning result. That is, the operation permission determining unit 250 may input the identification information about the specific network node and the data packet information related to the corresponding network node to a learning model generated as the learning result to acquire the type information of the corresponding network node as an output.

In one embodiment, when the management policy about the at least one network node of the same type contains the information about the operation of the specific network node, the operation permission determining unit 250 may determine whether to permit the operation of the specific network node based on the corresponding management policy. For example, when the management policy about the network node classified as the same type contains content to permit the operation, the operation permission determining unit 250 may permit the unregistered operation with respect to the specific network node.

When the permission of the unregistered operation in accordance with the plurality of management policies about the network nodes of the same type is present, the operation permission determining unit 250 may determine whether to finally permit the unregistered operation based on the majority decision, that is, based on the content in common complying with the management policy.

In one embodiment, the operation permission determining unit 250 may determine whether to permit the operation of the specific network node based on a management policy about a network node with the highest reliability among the at least one network node of the same type. The block-chain gateway may store the information about the nodes in the target network 150, and the node information may contain the reliability information of the network nodes. Therefore, the operation permission determining unit 250 may acquire the information, from the block-chain gateway, about the network node having the highest reliability among the network nodes classified as the same type, and finally determine whether to permit the unregistered operation based on the management policy about the corresponding network node.

The controller 270 may control the overall operation of the network self-diagnosis control device 130, and manage control flow or data flow between the management policy registering unit 210, the operation verifying unit 230, and the operation permission determining unit 250.

Figure 3:
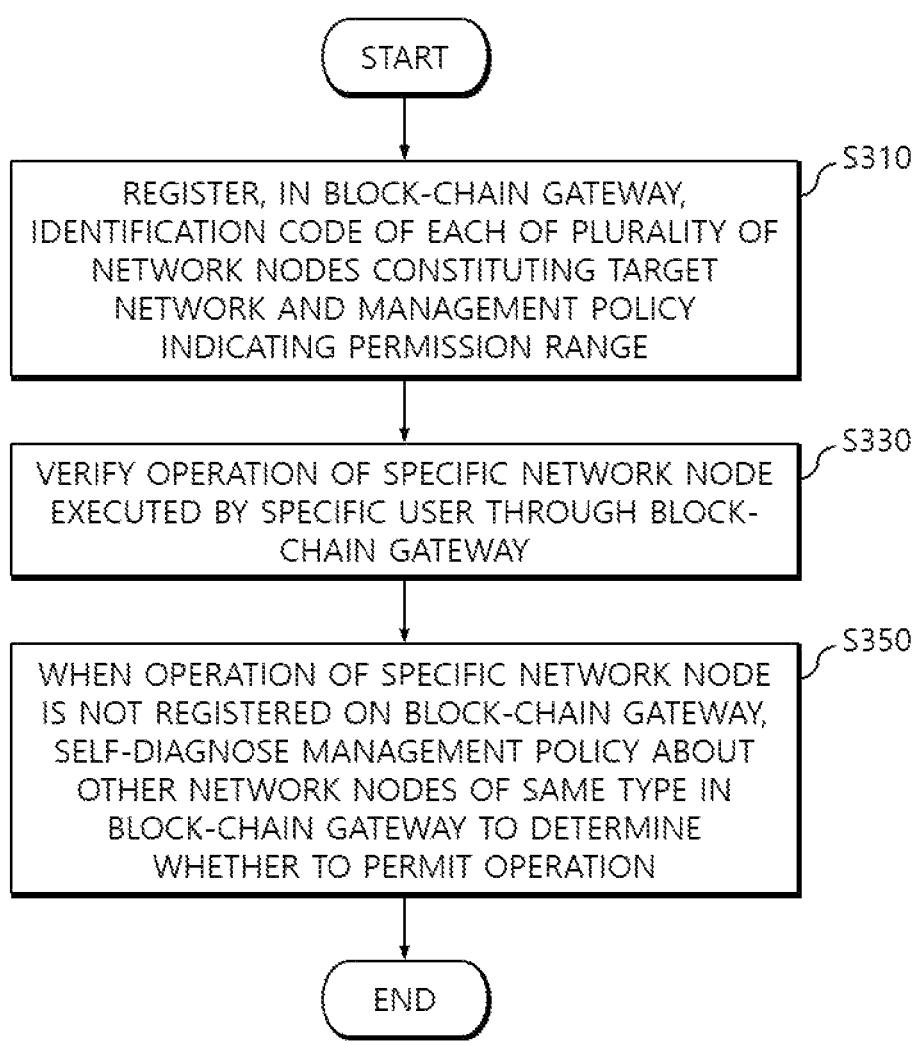
FIG. 3 is a flow chart illustrating a network self-diagnosis control process executed on a network self-diagnosis control device in FIG. 1.

FIG. 3 is a flow chart illustrating a network self-diagnosis control process executed on a network self-diagnosis control device in FIG. 1.

With reference to FIG. 3, the network self-diagnosis control device 130 may register, in the block-chain gateway through the management policy registering unit 210, the identification code of each of the plurality of network nodes constituting the target network 150 and the management policy indicating the permission range (S310).

In one embodiment, the management policy registering unit 210 may update the information stored in the block-chain gateway about the network nodes constituting the target network 150 at specific time intervals. The management policy registering unit 210 may determine the validities of the network nodes at specific time intervals, and update the information of the valid network nodes stored in the block-chain gateway based on the current information.

The network self-diagnosis control device 130 may verify the operation of the specific network node executed by the specific user through the block-chain gateway via the operation verifying unit 230 (S330).

In one embodiment, the operation verifying unit 230 may lower the reliability of the network node executed the operation in violation of the management policy in a level manner. For example, when the reliability of the network node is divided into six levels, the operation verifying unit 230 may lower the current reliability level of the network node that has executed the operation in violation of the management policy by two levels. When there is no reliability level that is two levels lower than the current reliability level of the corresponding network node, the operation verifying unit 230 may change the reliability to the lowest reliability level.

When the operation of the specific network node is not registered on the block-chain gateway, the network self-diagnosis control device 130 may self-diagnose the management policy about other network nodes of the same type in the block-chain gateway through the operation permission determining unit 250 to determine whether to permit the operation (S350).

In one embodiment, the operation permission determining unit 250 may determine the at least one of network node of the same type as the specific network node based on the various information that may be collected from the network nodes. The operation permission determining unit 250 may classify the network nodes based on devices, installed places, times, locations, or the like that are corresponding to the network nodes.

For example, the operation permission determining unit 250 may classify network nodes corresponding to a specific device such as a PC, a smart phone, or the like as the same type, and classify network nodes corresponding to devices installed in a specific building such as a school, a hospital, or the like as the same type.

Figure 4:
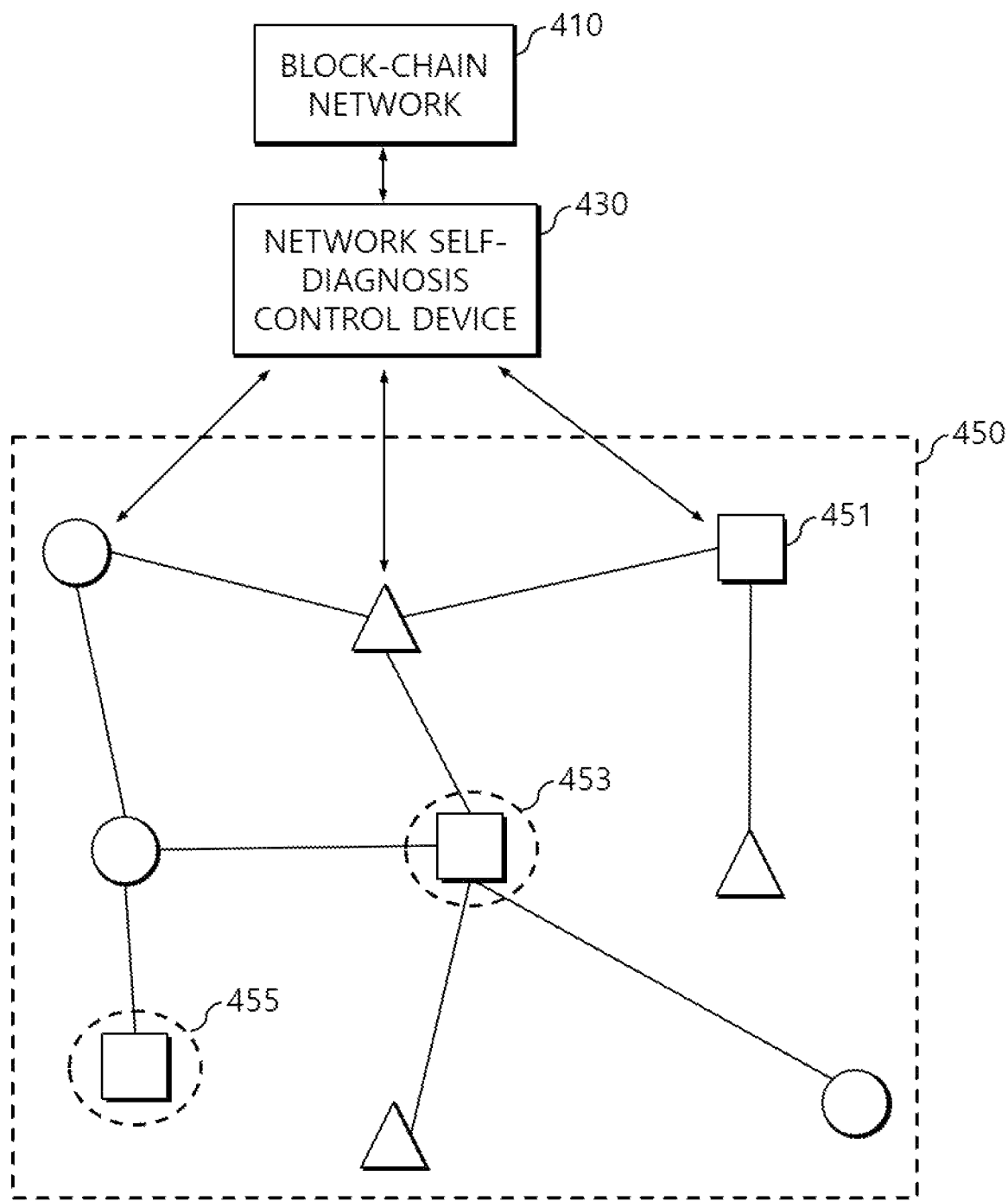
FIG. 4 is an exemplary diagram illustrating a process for executing self-diagnosis control for network nodes that form a target network in a network self-diagnosis control device in FIG. 1.

FIG. 4 is an exemplary diagram illustrating a process for executing self-diagnosis control for network nodes that forms a target network in a network self-diagnosis control device in FIG. 1.

With reference to FIG. 4, the network self-diagnosis control device 430 may be located between the block-chain network 410 and the target network 450 to relay the data exchange between the networks, and control operations of the network nodes in the target network 450. In this connection, the block-chain network 410 may be connected to the network self-diagnosis control device 430 via a block-chain gateway corresponding to one of the network nodes constituting the network.

The network self-diagnosis control device 430 may monitor the target network 150 via the operation verifying unit 230. In addition, when the operation of the specific network node is detected, the network self-diagnosis control device 430 may determine whether the operation matches with the information about the specific network node registered on the block-chain gateway. The operation verifying unit 230 may permit the operation complying with the management policy. Alternatively, the operation verifying unit 230 may not permit the operation in violation of the management policy, or may provide the caution information to the all of the other network nodes in the target network 450 while permitting the operation in violation of the management policy. Further, the operation verifying unit 230 may lower the reliability level of the network node that has executed the operation in violation of the management policy, and update the related information stored in the block-chain gateway.

The network self-diagnosis control device 430 may determine whether to permit the unregistered operation of the specific network node in the target network 150 via the operation permission determining unit 250. For example, when a management policy about a network node 1 451 is not registered on the block-chain gateway, the operation permission determining unit 250 may determine a network node 2 453 and a network node 3 455 as nodes of the same type as the network node 1 451, and retrieve management policies about the network node 2 453 and the network node 3 455 through the block-chain gateway. The operation permission determining unit 250 may determine whether to permit a specific operation of the network node 1 451 based on the management policies about the network node 2 453 and the network node 3 455.

While the present invention has been described with reference to preferred embodiments, it will be understood by those skilled in the art that various changes in form and details may be made therein without departing from the spirit and scope of the present invention as set forth in the following claims.

The disclosed technology may have following effects. However, purposes or effects are not meant to imply that a particular embodiment should include all or only these effects. Therefore, the scope of the disclosed technology should not be understood as being limited thereto.

The network self-diagnosis control device based on the block-chain according to an embodiment of the present invention may control the operation of the specific network node based on the management policy registered on the block-chain gateway.

The network self-diagnosis control device based on the block-chain according to an embodiment of the present invention may determine, when the unregistered operation is detected, whether to permit the corresponding operation with reference to the management policy about the other network nodes of the same type.

What is claimed is:

1. A network self-diagnosis control device based on a block-chain, the device comprising:
   circuitry configured to:
   register, in a block-chain gateway, an identification code for each of a plurality of network nodes constituting a target network and a management policy indicating a permission range;
   verify an operation of a specific network node executed by a specific user through the block-chain gateway;
   self-diagnose, when the operation of the specific network node is not registered on the block-chain gateway, management policies of other network nodes of a same type as the specific network node in the block-chain gateway;
   determine whether to permit the operation based on a result of the self-diagnosing;
   compare information about each of the plurality of network nodes with reference information pre-stored in the block-chain gateway;
   assign, based on the comparison determining that a corresponding network node is valid, an identification code to the corresponding network node;
   register, in the block-chain gateway, the management policy defined in relation to the operation, content, and range executed in association with the corresponding network node to which the identification code is assigned;
   learn data packet information transmitted from or received by the plurality of network nodes to determine at least one network node of the same type as the specific network node; and
   determine whether to finally permit the unregistered operation based on a majority decision when a permission of the unregistered operation in accordance with a plurality of management policies about the at least one network node is present, wherein when the operation of the specific network node violates the management policy registered on the block-chain gateway, the circuitry is further configured to change a reliability level of the specific network node to update the block-chain gateway, and wherein when the operation of the specific network node violates the management policy registered on the block-chain gateway, the circuitry is further configured to change the reliability level of the specific network node to a reliability equal to or below a predetermined level.

2. The device of claim 1, wherein the circuitry is further configured to determine, when monitoring the target network, and detecting the operation of the specific network node executed by the specific user, whether the detected operation matches with information about the specific network node registered on the block-chain gateway.

3. The device of claim 2, wherein when the operation of the specific network node complies with the management policy registered on the block-chain gateway, the circuitry is further configured to permit the operation execution of the specific network node, and update the block-chain gateway based on the operation execution.

4. The device of claim 2, wherein when the operation of the specific network node violates the management policy registered on the block-chain gateway, the circuitry is further configured to provide caution information about the specific network node to all of the other network nodes in the target network.

5. The device of claim 1, wherein when the management policy about the at least one network node of the same type contains information about the operation of the specific network node, the circuitry is further configured to determine whether to permit the operation of the specific network node based on a corresponding management policy.

6. The device of claim 1, wherein the circuitry is further configured to determine whether to permit the operation of the specific network node based on a management policy about a network node with a highest reliability level among the at least one network node of the same type.

* * * * *